E. N. SMITH.
RESILIENT WHEEL.
APPLICATION FILED JAN. 3, 1917.
1,233,722.
Patented July 17, 1917.
2 SHEETS—SHEET 1.
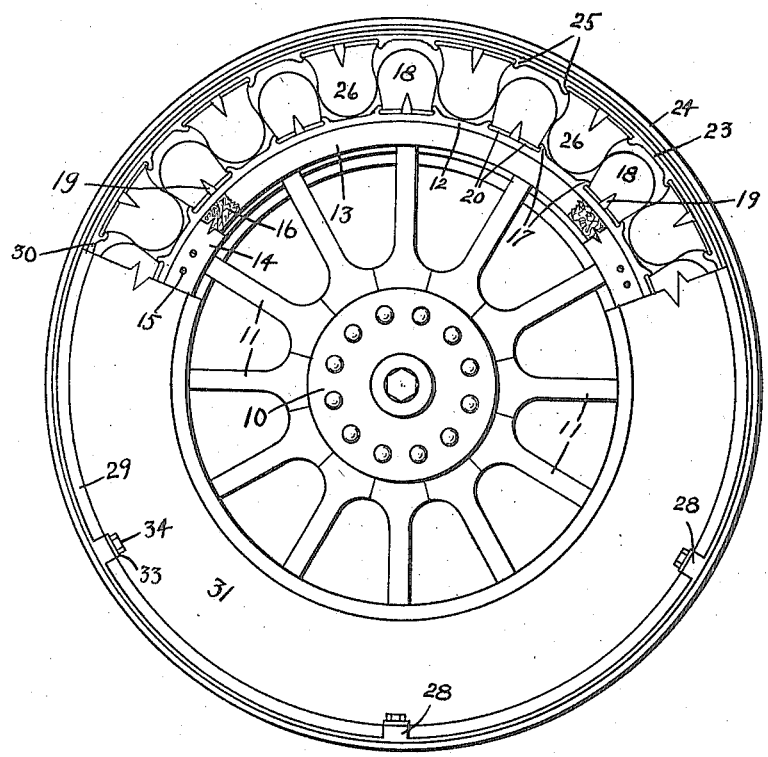
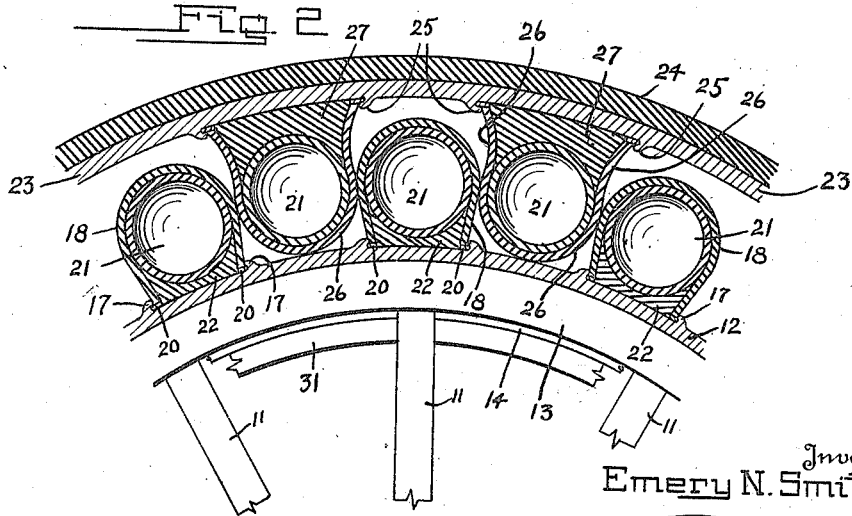
Inventor
Emery N. Smith.
By Lancaster and Allwine
His Attorneys E. N. SMITH.
RESILIENT WHEEL.
APPLICATION FILED JAN. 3, 1917.
1,233,722.
Patented July 17, 1917.
2 SHEETS—SHEET 2.
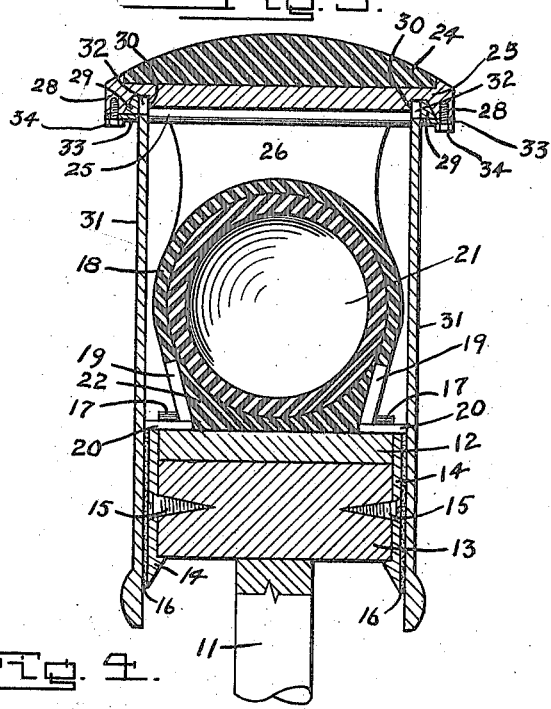
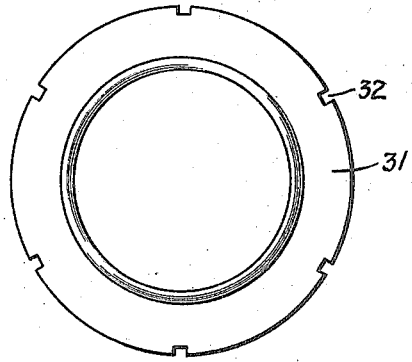
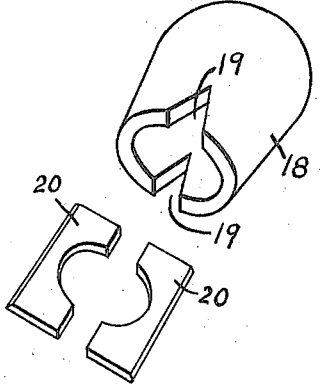
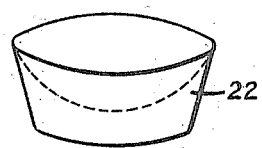
Inventor
Emery N. Smith.
By Lancaster and Allwine
His Attorneys

UNITED STATES PATENT OFFICE.

EMERY N. SMITH, OF AKRON, OHIO, ASSIGNOR OF ONE-HALF TO FREDERICK KEMPPEL, OF AKRON, OHIO.

RESILIENT WHEEL.

1,233,722. Specification of Letters Patent. Patented July 17, 1917.

Application filed January 3, 1917. Serial No. 140,384.

*To all whom it may concern:*

Be it known that I, EMERY N. SMITH, a citizen of the United States, and a resident of Akron, in the county of Summit and State of Ohio, have invented a certain new and useful Improvement in a Resilient Wheel, of which the following is a specification.

The present invention relates to resilient wheels, and has particular reference to a wheel structure adapted for vehicles, such as automobiles and heavy trucks.

It is an object of the present invention to provide a wheel of this nature which is supported by air under pressure, and which at the same time is puncture-proof and possesses all of the resiliency obtained by the use of the form of pneumatic tire now commonly employed.

Another object of the present invention is to provide a wheel which is pneumatically supported, and which requires but little attention while in use, the same being so constructed that it is not necessary to inflate it.

The invention has for a further object to provide a resilient wheel with a plurality of independent pneumatic supporting members which are detachably connected to the parts of the wheel and which may be removed, interchanged, or independently repaired for the purpose of maintaining the wheel economically in working condition.

It is the further aim of the present invention to provide a wheel structure of this nature which is capable of withstanding considerable wear and giving relatively long service while in use, the pneumatic means being relatively small and of a relatively large number so as to impart the necessary resiliency to the tire and provide a wheel which is relatively strong so as to support heavy vehicles.

The above, and various other objects and advantages of this invention will be more particularly brought out in the following detailed description of the present preferred embodiment, the same being illustrated in the accompanying drawings wherein:

Figure 1 is a side elevation of a wheel constructed according to the present invention part of the same being shown in section.

Fig. 2 is an enlarged longitudinal section taken through a portion of the wheel, adjacent to the tread or periphery thereof.

Fig. 3 is a further enlarged section taken transversely through the outer portion of the wheel.

Fig. 4 is a detail reduced view showing in side elevation one of the detachable retaining plates which is carried upon the outer rim.

Fig. 5 is a detail perspective view of one of the ball-carrying pouches, showing the retaining flanges thereof separated and detached from the pouch.

Fig. 6 is a detail perspective view of one of the cushion blocks for supporting the pneumatic member in the pouch.

Referring to these drawings, wherein like parts are designated by similar numerals of reference throughout the several views, 10 designates a hub of ordinary construction, from which radiate spokes 11, the latter being relatively short and provided upon their outer ends with an inner rim 12. The rim 12 comprises, preferably, a relatively flat metallic band which is shrunk or otherwise suitably secured to the peripheral face of the felly 13 of the wheel. A pair of flat rings 14 is secured against the opposite sides of the felly 13 and against the opposite edges of the inner rim 12 by means of screws 15 or the like which pass inwardly through the rings 14 and engage in the felly 13. The inner edges of the rings 14 project beyond the inner side or face of the felly 13, as shown to advantage in Fig. 3, and the outer faces of the rings 14 are covered by strips of felt 16 or the like for a purpose which will hereinafter appear.

The inner rim 12 is provided, across its peripheral face, with pairs of transversely extending locking beads or flanges 17. Detachably secured to the inner rim 12 is a plurality of spaced-apart flexible pouches 18, which are constructed from rubber, canvas, leather or a suitable composition of the same, and which are closed at their outer ends and provided with reduced inner ends or mouths adapted to be expanded by virtue of longitudinal slits 19 formed in their opposite sides and at their inner ends.

To the marginal edge of the mouth of each pouch 18 is permanently secured a pair of retaining flanges 20 which, as shown in detail in Fig. 5, is in the form of a pair of relatively flat metallic strips having registering notches or recesses in their inner edges to conform to the opening of the mouth of the pouch, and which are adapted to engage, at their outer edges, beneath the retaining beads or flanges 17 of the rim 12. It will be noted that the flanges 20 conform at their inner edges to the opposite sides of the mouth of the pouch, and that as the flanges 20 are formed of two separate members they permit of the relatively easy expanding or opening of the mouth of the pouch.

Within each pouch 18 is placed a pneumatic member, the same being in the form of a ball of rubber, canvas or a composition of the same, which contains air under pressure, and which is adapted to fit snugly in the pouch 18, as shown at 21. The balls 21 are supported at their inner sides upon cushion blocks 22, of rubber or the like which are fitted into the inner or open ends of the pouches 18, which have substantially frusto-conical form, a concavity in their outer sides adapted to snugly receive the balls 21 therein, and which have flat bases or inner ends adapted to seat upon the rim 12. The cushion blocks or supports 22 are of such size that they are adapted to fit in the notches of the flanges 20 and hold the latter in spread-apart position sufficiently to interlock the same beneath the beads or flanges 17 of the rim 12. From Fig. 3, particularly, it will be noted that the side rings 14 which are secured to the felly 13, terminate at their outer edges flush with the peripheral surface of the rim 12 so that the flanges 20 are permitted a lateral or transverse sliding movement in positioning and removing the same from beneath the retaining beads or flanges 17. When the pouches 18 are secured to the inner rim 12, and contain the balls 21 and the cushion blocks 22, the mouths of the pouches are slightly closed or compressed so as to more firmly hold the balls 21 in position, and to insure the interlocking engagement of the flanges 17 and 20.

The wheel is provided with an outer rim 23 in the form of a relatively flat metallic strip provided upon its periphery with a preferably solid rubber cushion tread 24, the latter being adapted to deaden the sound or rumbling of the wheel when in operation, and to thus insure the noiseless operation of the wheel. The inner face or side of the rim 23 is provided with pairs of transversely extending flanges or ribs 25 which are similar in form to the flanges or ribs 17 of the inner rim, and which are arranged in staggered or offset relation to the same. These flanges or ribs 25 are adapted to interlock with the flanges 20 of pouches 26 which are carried upon the outer rim and are detachably secured thereto by means of the flanges 20 and 25. The pouches 26 of the outer rim 23 are provided with the pneumatic members 21 and the cushion blocks 27, as clearly shown in Fig. 2. It will be noted that the cushion blocks 27 of the outer pouches 26 flare at their bases, and that the pairs of ribs or flanges 25 are spaced apart a greater distance than the space between the flanges 17 of the inner rim 12. This difference in structure and arrangement of the parts retains the pouches 18 and 26 in interfitting relation and at the same time compensates for the differences in length of the inner and outer rims.

The outer rim 23 is provided, at equi-distant points throughout its circumference, and at its opposite edges, with inwardly extending lugs 28 having inner inclined sides or faces adapted to receive thereagainst the outer correspondingly inclined faces of a pair of opposed locking rings 29. The rim 23, inwardly of the lugs 28, is rabbeted at its inner face and at its opposite edges to provide outwardly facing shoulders 30 at each side of the rim adapted to receive thereagainst a pair of detachable inclosing and retaining plates 31. The plates 31 are in the form of relatively broad, flat rings provided in their peripheral edges and at equi-distantly spaced-apart points with notches or recesses 32 adapted to register with the lugs 28 and to permit the latter to pass through the recesses 32 as the side plates 31 are moved into position. The locking rings 29 are adapted to engage against the outer sides of the plates 31 and to hold the same firmly against the shoulders 30. The locking rings 29 are secured in such position by means of clips 33 which extend inwardly from the free ends of the lugs 28 and which are detachably secured thereto by means of machine screws 34, or the like. The inner edges of the side plates 31 extend beyond the rings 14 carried by the felly 13, and are adapted to bear against the strips of felt 16, carried by the rings of the felly. In this manner, the space between the inner rim 12 and the outer rim 23 is completely inclosed, and the felt packing 16 prevents access of dust, moisture and the like to the pouches 18 and 26. At the same time, the side plates 31 are permitted to slide against the opposite sides of the felly 13 and the pneumatic members or balls 21 are permitted a free flexing movement during the rolling of the wheel.

From the above description it will be readily understood that the pouches 18 and 26 may be independently or separately removed from their respective rims 12 and 23 for the purpose of renewing the pouches or balls 21 for the repair of any portion of the pneumatic structure which may become worn or broken. To remove one of the pouches it is only necessary to slide the flanges 20 thereof laterally from beneath the stationary flanges 17 or 25 of the inner or outer rim. The mouth of the pouch may now be spread open and the blocks 22 or 27 removed therefrom, and the balls 21 forced out of the pouch. Each rim is provided with a row of spaced-apart pneumatic members which are detachably retained thereon, and when the members are in position and the rims are in their proper places, the pneumatic members interfit and not only support the rims one upon the other, but also provide for a circumferential yielding between the rims to absorb all shocks placed upon the hub 10 should the same be mounted upon a driving axle or the like. The side plates 31 retain both sets of pneumatic members 21 in position upon their respective rims, and also provide means for holding the rims 12 and 23 in true concentric relation and from lateral displacement.

It is of course understood that various changes and modifications may be made in the details of construction of the above-specifically described resilient wheel without departing from the spirit of this invention, such changes and modifications being restricted only by the scope of the following claims.

I claim:

1. In a resilient wheel, the combination of an outer rim, an inner rim, a circular row of abutting resilient members arranged between said rims, and means for alternately securing said members to the outer and inner rims, the members of one of said rims engaging the opposite rim, and the members of the opposite rim being spaced from the first rim.

2. In a resilient wheel, the combination of an outer rim, an inner rim, a circular row of resilient balls arranged between said rims, and independent flexible pouches inclosing said balls and secured alternately to said inner and outer rims.

3. In a resilient wheel, the combination of an outer rim, an inner rim, a row of resilient balls arranged between said rims, flexible pouches inclosing said balls, cushion blocks arranged in said pouches and engaging said balls, and means for detachably securing said pouches alternately to the inner and outer rims.

4. In a resilient wheel, the combination of an outer rim, an inner rim, a circular row of resilient balls arranged between said rims, flexible pouches engaging said balls and having expansible mouths, cushion blocks fitting in the mouths of said pouches and against said balls to support the latter, and detachable securing means on said rims adapted to alternately engage the mouths of said pouches when closed to alternately hold said resilient balls to the inner and outer rims.

5. In a resilient wheel, the combination of inner and outer rims, one rim provided upon its peripheral surface with pairs of transversely extending retaining flanges, a plurality of pouches provided at their open ends with opposed outwardly extending flanges, balls fitting in said pouches, cushion blocks fitting in said pouches against said balls, the mouths of said pouches being adapted to be closed and the flanges thereof being adapted for insertion beneath the pairs of flanges of said rims, and means for retaining said flanges in interlocking position.

6. In a resilient wheel, the combination of inner and outer rims, and a plurality of supporting devices between the rims, one of said devices including a pair of transversely extending retaining flanges secured across the peripheral surface of one rim, a pouch provided with an open end and outwardly extending flanges at the opposite sides of said open end, and a resilient member adapted for insertion in said pouch, said pouch being adapted to be closed and the flanges of the pouch adapted for insertion beneath the retaining flanges on said rim.

7. In a resilient wheel, the combination of an outer rim, an inner rim, supporting means arranged between the rims, said outer rim provided at spaced-apart points and at its opposite edges with inwardly extending lugs, a pair of retaining plates provided with recesses in their outer edges adapted to register with said lugs and permit the positioning and removal of the side plates against and from the opposite edges of said outer rim, locking rings adapted for engagement against the outer faces of said retaining plates and for engagement against the inner sides of said lugs, and securing means carried by said lugs for engagement with said locking rings to detachably retain the latter in position.

8. In a resilient wheel, the combination of an outer rim, an inner rim, a circular row of resilient members arranged between said rims, detachable securing means independently connected to said resilient members and alternately engaging said rims and adapted to be detached therefrom by a transverse sliding movement from the rims, and a pair of opposed retaining plates secured to the outer rim and slidably engaging against the opposite sides of the inner rim for holding said resilient members in position upon the rims and for holding the rims from lateral displacement from one another.

9. In a resilient wheel, the combination of an outer rim, an inner rim, a circular row of resilient members arranged between said rims, retaining means independently engaging said resilient members and alternately and detachably engaging said rims and adapted to be removed therefrom by a lateral transverse movement, and a pair of retaining plates secured to one of said rims and slidably engaging against the opposite sides of the other rim whereby to hold the rims from lateral displacement with respect to each other and to retain said resilient members in interlocking relation with their respective rims.

EMERY N. SMITH.

Copies of this patent may be obtained for five cents each, by addressing the "Commissioner of Patents, Washington, D. C."